Nov. 6, 1928.

H. B. COOPER 1,690,333

ACCELERATOR FOR MOTOR VEHICLES

Filed Jan. 17, 1927

Inventor
HENRY B. COOPER his Attorneys

Patented Nov. 6, 1928.

1,690,333

UNITED STATES PATENT OFFICE.

HENRY B. COOPER, OF COLUMBUS, OHIO.

ACCELERATOR FOR MOTOR VEHICLES.

Application filed January 17, 1927. Serial No. 161,558.

This invention relates to the auxiliary throttle control of a motor vehicle, such throttle being commonly called the "accelerator" and operated by the foot of the driver.

The head or pedal member of the accelerator is usually a member fixed to a shank or actuator rod that extends to and is connected with the lever and rod, or perhaps a plurality of either or both of them that actuate the throttle. In practice the operation of said head or pedal member involves a good deal of friction with the sole of the shoe and wears down the head and sole and, moreover, the unchangeable relation of said head to its shank causes uncomfortable and fatiguing strains upon the foot and leg muscles in the efforts to operate it, especially when the vehicle is driven for a long period of time.

The object of the invention is to provide a head or pedal member for the accelerator that will accommodate itself to the position of the foot and reduce the friction involved in the operation by the foot and thereby avoid the cause of the aforesaid muscular strains and the fatiguing consequences referred to.

The invention is embodied in the example herein shown and described, the features of novelty being finally claimed.

In the accompanying drawings—

Figure 1:
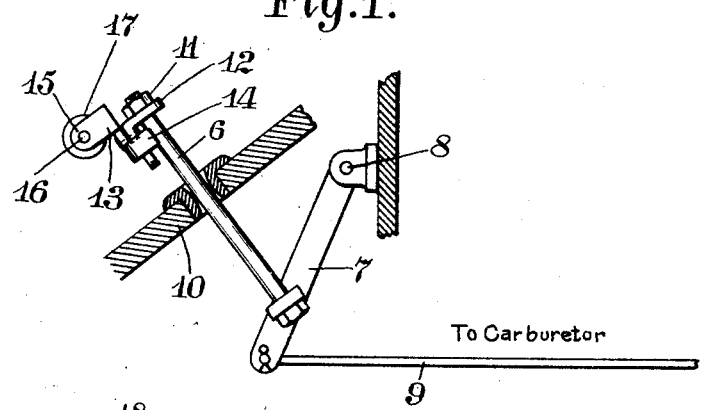
Figure 1 is a side view of the invention with a fraction of the vehicle floor board in section.
Figure 2:
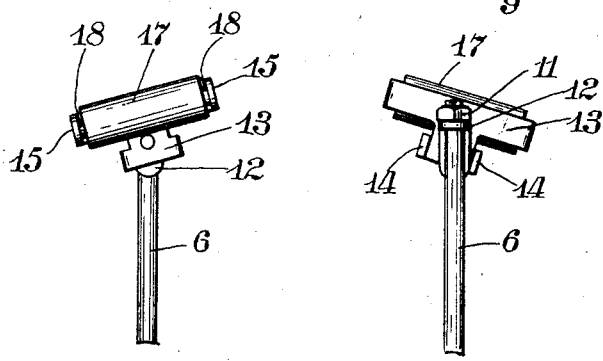
Fig. 2 is a front view of the pedal member or head and a portion of its stem.
Figure 3:
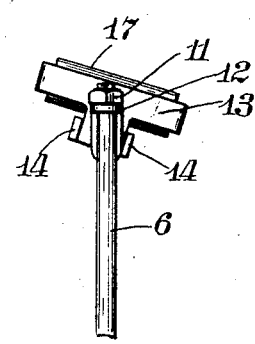
Fig. 3 is a rear view of the same.
Figure 4:
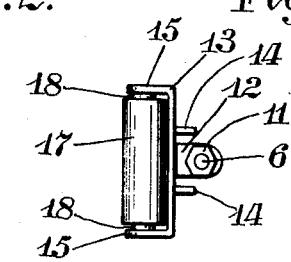
Fig. 4 is a top plan view of the accelerator pedal member or head showing its connection with the stem.

Referring first more particularly to Figs. 1 to 4 inclusive the character 6 designates the actuating rod or stem which is threaded at its upper end and suitably connected at its lower end with a lever 7 hinged at 8 to the body of the car. The lever 7 has connected with its lower end a rod 9 that extends to the carbureter of the vehicle as indicated by words on the drawing for suitably operating said carbureter as usual.

The actuating rod or stem 6 extends up through a suitable opening in the floor board 10 and includes fastened to it at its upper end by means of a nut 11 an angular bracket 12. Pivotally connected with the downwardly extending portion of the bracket 12 is a frame 13 having two extensions or stops 14 and 14 that are spaced from the opposite edges of the downwardly extending portion of the bracket 12 so that suitable lateral oscillations of the frame 13 are permitted but limited in both directions. The upper portion of the frame 13 is bent forward to form ears as seen at 15 and 15 that are provided with perforations to receive the shaft 16 of an anti-friction roller 17 which can be made of hard rubber or steel. Loose washers 18 can be interposed on the stud shaft 16 between the ends of the roller and the ears or bearing members 15.

Figure 5:
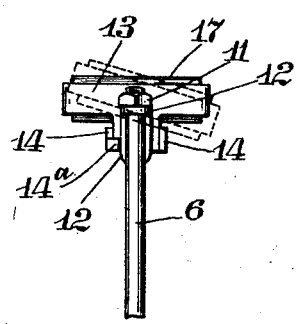
Fig. 5 is a rear view of the head and a portion of its stem illustrating a modification.

In Fig. 5 the construction is the same as in the other views except that in this view one of the stops 14 is shown as provided with a teat or lug 14ª laterally bent from said stop, said teat adapted to prevent the anti-friction roller-carrying frame from tipping in one direction from a right angle position of the roller to the stem and confining its tipping effect to one side as shown by broken lines, this being desirable in some instances because the foot is held in an inclined position owing perhaps to the fact that the seat does not permit a perfect alinement of the foot with the leg or for other reasons.

In practice the accelerator pedal member or head is pressed to effect the control of the supply of gas to the engine as heretofore but it will be observed that because it is laterally tiltable the anti-friction roller not only accommodates itself to the different positions of the foot, which can be pivoted at the heel on the floor board, but also reduces the friction occasioned by the rise and fall of the foot and the changing relation of the foot to the anti-friction roller.

The forms of the parts can be changed without departing from the gist of the invention as claimed. It will be understood, of course, that the device can be adapted to practically any make of motor vehicle.

What I claim is:

1. An accelerator for motor vehicles including an actuator rod and a frame, a rotatable pedal member journaled in said frame, and means pivotally connecting said frame with the actuator rod.

2. An accelerator for motor vehicles including an actuator rod and a frame, a rotatable pedal member journaled in said frame, means pivotally connecting said frame with the actuator rod and means limiting the movement of said frame on said pivoting means.

3. An accelerator for motor vehicles including an actuator rod and a frame, a rotatable pedal member journaled in said frame, means pivotally connecting said frame with the actuator rod and means limiting the movement of said frame on said pivoting means to and from a position substantially at right angles to said rod.

4. An accelerator for motor vehicles including a frame and an actuator rod including a bracket secured at the upper end thereof, a rotatable pedal member journaled on said frame, and means pivotally connecting said frame with said bracket.

5. An accelerator for motor vehicles including a frame and an actuator rod including a bracket secured at the upper end thereof, a rotatable pedal member journaled on said frame, means pivotally connecting said frame with said bracket, and means on said frame contacting with said bracket to limit the lateral movement of said frame.

HENRY B. COOPER.